United States Patent [19]

Masengill, Sr.

[11] 3,939,549

[45] Feb. 24, 1976

[54] PROCESS OF ASSEMBLING FURNITURE CORNER JOINTS

[76] Inventor: William W. Masengill, Sr., P.O. Box 1520, Morristown, Tenn. 37814

[22] Filed: Nov. 14, 1974

[21] Appl. No.: 523,872

[52] U.S. Cl................... 29/432; 29/200 B; 29/526; 85/13; 100/232

[51] Int. Cl.[2] .......................................... B23P 11/00

[58] Field of Search...... 29/432, 526, 208 D, 208 R, 29/200 B; 85/13, 10 R; 227/152; 100/DIG. 13, 232

[56] References Cited

UNITED STATES PATENTS

| | | | |
|---|---|---|---|
| 2,330,756 | 9/1943 | Stanger | 29/526 |
| 3,305,252 | 2/1967 | Jureit | 85/13 X |
| 3,413,703 | 12/1968 | Sanford | 29/432 X |
| 3,427,055 | 2/1969 | Jureit et al. | 85/13 X |
| 3,837,274 | 9/1974 | Zaccard | 227/152 X |
| 3,861,094 | 1/1975 | Jureit et al. | 85/13 X |

FOREIGN PATENTS OR APPLICATIONS

| | | | |
|---|---|---|---|
| 766,464 | 1/1957 | United Kingdom | 85/13 |

*Primary Examiner*—Victor A. Di Palma
*Attorney, Agent, or Firm*—Burns, Doane, Swecker & Mathis

[57] ABSTRACT

A method of assembling furniture corner joints between framing members, such as rails or boards set at angles to each other. The corner joint is secured by connector plates, each of which has end portions set at right angles to each other corresponding with the angle of the framing members and having integral one-piece teeth struck from the body of the plate normal to the plane of the respective end portion. The teeth are of uniform length and are spaced apart in areas adjacent the end portions of the plate, leaving a smooth inner face on the connector plate in the area where the framing members would be brought together to form the joint. The method is in two steps, one of which causes the teeth on one end of the plate to penetrate the face of the framing members and thereafter the opposite angular portion of the plate is moved relatively toward the second framing member to cause the teeth thereof to enter the framing member. In each step the teeth, which are of uniform length, enter the adjacent face of the framing member in straight lines. These steps enable a plurality of corner joints of one article of furniture to be assembled and secured in one operation by successive steps.

4 Claims, 5 Drawing Figures

FIG.1
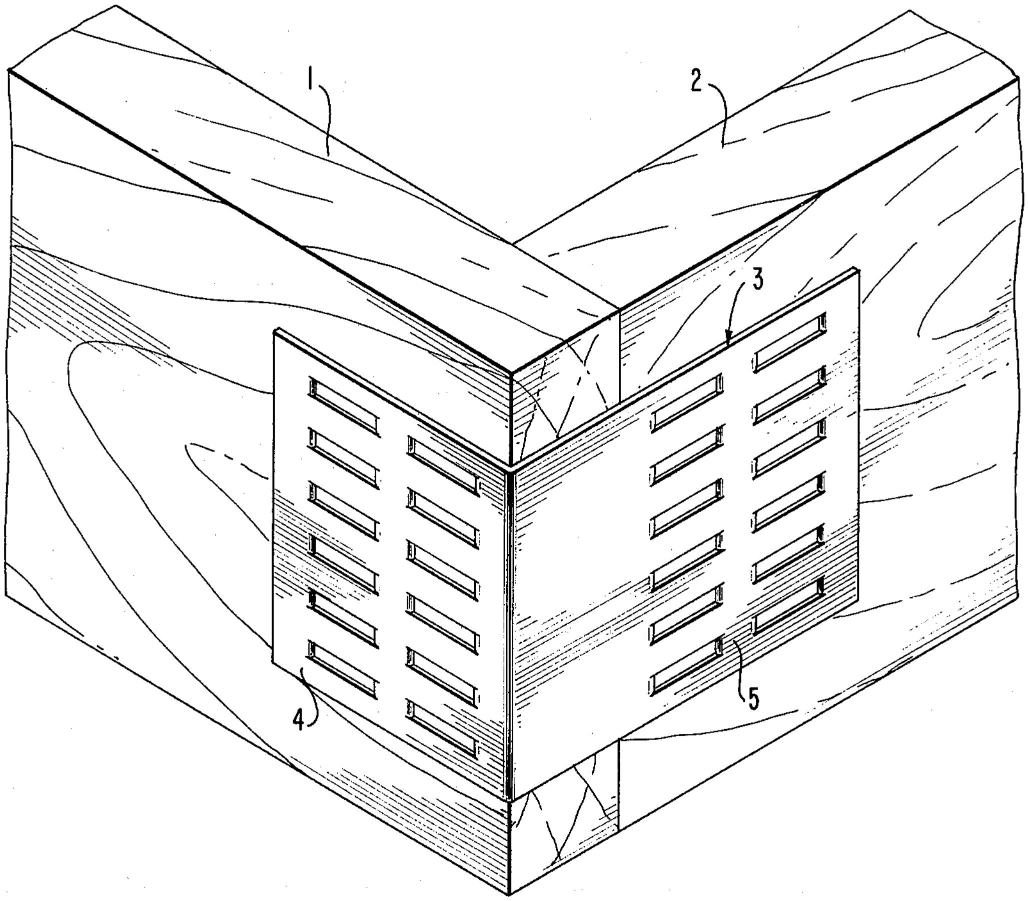
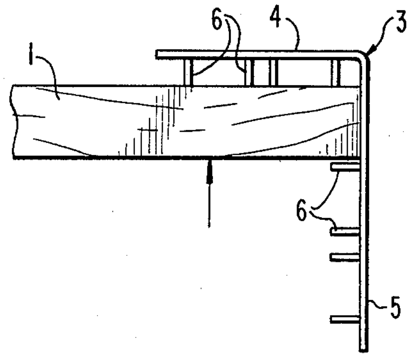
FIG.2
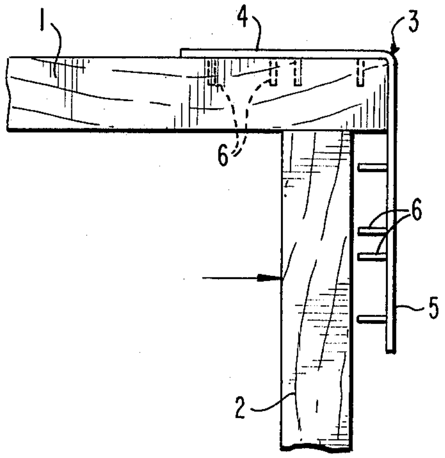
FIG.3

PROCESS OF ASSEMBLING FURNITURE CORNER JOINTS

SUMMARY OF THE INVENTION

This invention relates to improvements in processes of assembling furniture corner joints.

It has been the customary practice heretofore to use wooden rails or boards as the supporting members for an article of furniture such as a chair, for example. These wooden rails or boards are usually set at angles to each other and are secured together by dowels, screws, staples, or other fastenings. Angle brackets have been applied thereto but these must be secured manually and individually by screws or nails. Toothed connector plates have been used for securing together parts of wooden members such as roof trusses, for example. However, no practical way has been found heretofore for securing together the wooden members forming the corner of an article of furniture by means of a toothed connector plate. In other types of joints using wooden members, attempts have been made to use connector plates where tightness and rigidity of the joint is not required.

Thus, when the boards are set at an angle to each other, a connector plate may be secured to one of the boards and then bent around the corner and thereafter secured to the other board by driving the teeth into the face thereof. This method requires that the teeth enter the second board at an angle, which leaves the corner in an unsecured fashion, not as tight as is desired in an article of furniture. Moreover, it requires the placement and securing of each connector plate manually and individually, so that a substantial number of them could not be applied in one operation.

One object of this invention is to overcome the foregoing objections and to improve the method of assembling furniture joints so as to enable a plurality of joints to be assembled in one operation.

Another object of the invention is to provide for the effective and secure connection of rails or boards in a joint to be fastened securely by means of a tooth connector plate.

Still another object of the invention is to provide for the use of the toothed connector plates in multiple assembly of corner joints to facilitate the speedy and inexpensive frame structure of an article of furniture and yet having corner joints that are secure and effective for maintaining the rigidity of the frame.

These objects may be accomplished according to one embodiment of the invention by the use of corner connector plates, each of which has a pair of side portions set at right angles to each other, with each of the side portions having integral teeth struck from the body thereof and preferably formed of metal or other suitable material. The teeth are of uniform length so as to enter and penetrate the face of the wooden members constituting the joint of the frame of the article of furniture. The teeth are spaced over the inner face of each side portion of the connector plate, usually in rows transversely thereof but the areas at the respective end portions of the connector plate are spaced apart from each other to allow for the entry of the ends of the boards to enter and abut directly against the sides of the connector plate.

The connector plate is applied to the angular boards or rails in two steps. First, one side portion of the connector plate is applied directly against the face of one of the boards or rails by pressure applied to the outer face of the plate which will cause the teeth to enter in straight lines normal to the face of the board or rail until the teeth have penetrated their full depths into the latter. Then the other board or rail is brought into an angular relation to the first and is pressed onto the teeth at the other lateral side of the connector plate. The teeth of the latter are thus forced into the side face of the second board or rail in straight lines and normal to the plane of the second section of the connector plate.

These operations may be performed in multiple as when a plurality of joints of one frame are assembled and connector plates are applied to each for securing the corners of the frame effectively.

BRIEF DESCRIPTION OF DRAWINGS

This embodiment of the invention is illustrated in the accompanying drawings in which:

FIG. 1 is a perspective view of a corner joint showing a connector plate applied thereto according to this method;

FIG. 2 is a top plan view of a corner joint showing one step in the application of the connector plate thereto;

FIG. 3 is a similar view showing the second step in the application of the corner joint;

DETAILED DESCRIPTION OF DISCLOSURE

Figure 4:
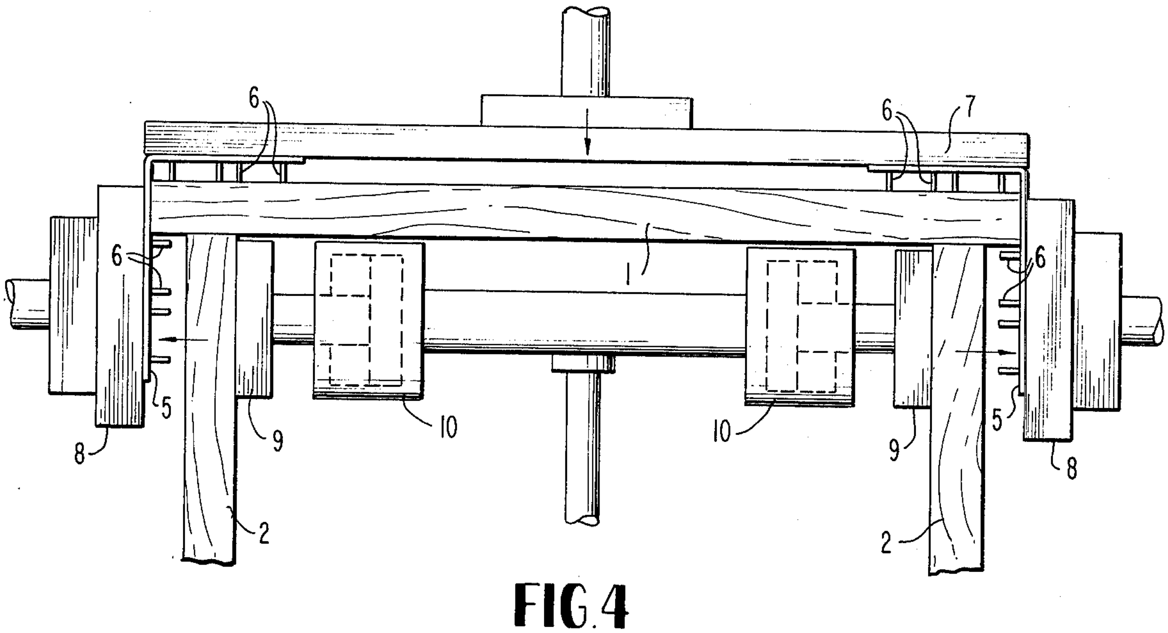
FIG. 4 is a view of the corner joint in a multiple assembly and showing a press for securing the corner plate in place.

The invention is illustrated in connection with a corner joint generally of the character illustrated in FIG. 1. Each joint is formed of two rails or boards brought together at right angles to each other. Usually, these are made of wood or other non-metallic material which can be secured rigidly at right angle relation and will form a secure and rigid joint. The end of the member 2 is brought into abutting relation with the inner face of the member 1 and directly at right angles thereto. In forming a secure joint suitable for an article of furniture, these rails or boards must be held in rigid relation with no break between the end of one and the base of the other or gap therebetween.

A connector plate is illustrated generally at 3. This is usually formed of metal or other suitable material having sufficient rigidity not only to provide for the formation of teeth struck therefrom, but also to maintain the joint in tight right angular relation. The connector plate 3 is preformed of the desired right angle relation, forming side portions 4 and 5, respectively, of sufficient area to overlap a substantial portion of each of the members 1 and 2. In preforming the connector plate 3, portions 4 and 5 thereof have struck from the inner faces of these portions teeth 6, all of which are of uniform length to penetrate to a substantial extent into the faces of the members 1 and 2. The teeth 6 are struck from the respective connector portions 4 and 5 at direct right angle relation thereto and parallel with each other. Usually, these teeth 6 are set in rows forming toothed areas over the inner faces of each of the portions 4 and 5. The rows of teeth on the portion 5 of the connector plate should be spaced from the angular corner of the connector plate, a distance at least sufficient to accommodate the end edge of the framing member 1.

The steps of assembling a corner joint are illustrated particularly in FIGS. 2 and 3. The connector plate 3 is applied to the end portion of the framing member 1 in the relation illustrated in FIG. 2, with the inner face of the portion 5 of the connector plate abutting directly against the end edge of the framing member 1. Then the teeth 6 are driven into the face of the framing member 1 by force applied against the outer face of the portion 4 of the connector plate. This continues until the teeth have penetrated fully into the framing member 1, as illustrated in FIG. 3. Then the framing member 2 is brought into parallel relation with the portion 5 of the connector plate and abutting at its end against the inner face of the framing member 1.

It is preferred to apply pressure to the inner face of the framing member 2 to force the latter onto the prongs 6 of the portion 5. This pressure is applied in the direction of the length of the prongs, or teeth, in order that the latter will enter the outer face of the framing member 2 in directions normal to the plane of the portion 5. When this has been completed, the parts will assume the relation shown in FIG. 1, thus forming a corner joint with the framing members 1 and 2 in direct right angle relation to each other in a tight joint with no break or crack therebetween. The teeeth 6 of both side portions 4 and 5 of the connector plate provide a very tight and secure joint in a very simple operation.

The method of assembly as described can be applied in the formation of a single joint, but it may also be used according to this invention in assembling a plurality of joints simultaneously. The method makes possible the multiple application of the connector plates to several joints of a single frame. This is shown diagrammatically in FIGS. 4 and 5 in a suitable power press operated pneumatically or hydraulically.

Figure 5:
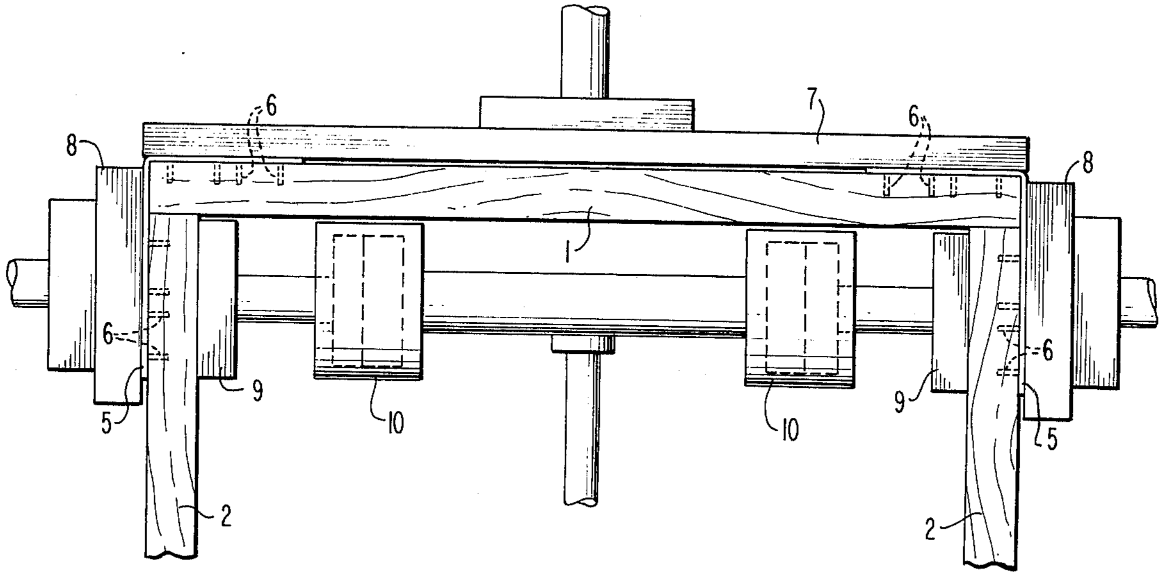
FIG. 5 is a similar view showing the second step thereof.

As an example, I have shown in FIG. 4 a press plate 7 in position to perform the first operation according to FIG. 2. This press plate 7 can be operated by hydraulic or pneumatic pressure from a suitable press head, as illustrated in FIG. 5. During this operation, the rail or board 1 will be held in the frame by a suitable part of the press (not illustrated).

The second step provides for the relative motion between the rail or board 2 and the end portions 5 of the connector plates 3. Heads 8 are moved into abutting relation with the outer faces of the portions 5, while heads 9 are moved against the inner faces of the rails or boards 2. These heads 9 are moved in opposite directions simultaneously by power cylinders 10 operated from a suitable source of power.

Thus, two or more such connector plates may be applied simultaneously to adjacent portions of the single frame of an article of furniture.

In this way, each step of the operation can be performed instantaneously on one or a plurality of joints, making up a single frame and will be effective in forming corner joints that are secure without gaps between the parts thereof. This reduces the time involved and effects a material saving in cost of forming the frame of an article of furniture. It also provides corner joints that are secure and will be maintained effective throughout the life of the furniture. It is, thus, faster to perform, especially in multiples as made possible by this invention. It is more secure in that the connector plates will be effective in maintaining the parts in the relation desired.

While the invention is described in connection with furniture joints, it is also applicable and useful in connection with other types of word or framing joints where parts need to be secured together at a corner, securely.

While the invention has been illustrated and described in one embodiment, it is recognized that variations and changes may be made therein without departing from the invention as set forth in the claims.

I claim:

1. A method of making a furniture corner joint between framing members in planes set at an angle to each other comprising placing over the corner a toothed connector plate having end portions disposed at an angle to each other corresponding with the framing members, each end portion having integral teeth struck out from the body of the plate over substantial areas thereof normal to the plane of the respective end portions and normal to the plane of the adjacent framing member, relatively moving one of the framing members with respect to the other framing member and the adjacent end portion of the connector plate toward each other penetrating the teeth thereof into said one framing member in a straight line, lengthwise of the teeth, and thereafter relatively moving the other framing member with respect to the one framing member and the adjacent end portion of the connector plate toward each other penetrating the teeth thereof into said other framing member in a straight line lengthwise of the teeth thereof.

2. A method of making a furniture corner joint according to claim 1, wherein the first mentioned framing member has the end thereof in abutting relation with the adjacent face of the connector plate during the first mentioned movement, and the end of the second framing member is thereafter moved into abutting relation with a face of the first mentioned framing member before the second mentioned relative movement penetrating the teeth into the second framing member.

3. A method of making a plurality of furniture corner joints between wooden framing medmbers in planes set at an angle to each other, comprising preparing toothed connector plates each having end portions disposed at an angle to each other corresponding with the angle of the framing members, each end portion having integral teeth struck out from the body of the plate normal to the plane of the respective end portions and normal to the faces of the adjacent framing members, assembling the plurality of connector plates at the ends of one framing member having one end portion of each connector plate extending parallel with said framing member, applying pressure simultaneously at opposite end portions of the framing member relatively forcing the teeth into said member, thereafter assembling additional framing members parallel with the other end portions of the connector plates, and simultaneously applying pressure in opposite directions to the last mentioned framing members and the adjacent portions of the connector plates in directions normal to the planes of the plates forcing the teeth into the framing member.

4. A method of making a plurality of furniture corner joints according to claim 3, wherein the first mentioned framing member is in abutting relation with the inner faces of the connector members at the ends thereof before the first mentioned application of pressure, and the second mentioned framing members have the ends thereof abutting against the adjacent face of the first framing member before the second mentioned application of pressure.

* * * * *